3,521,339
METHOD OF MAKING CAPACITORS
Archibald N. Wright, Schenectady, and Richard C. Merrill, Glens Falls, N.Y., assignors to General Electric Company, a corporation of New York
Continuation-in-part of application Ser. No. 530,813, Mar. 1, 1966. This application Apr. 1, 1969, Ser. No. 822,788
The portion of the term of the patent subsequent to June 3, 1986, has been disclaimed
Int. Cl. H01g 13/00
U.S. Cl. 29—25.42                                                13 Claims

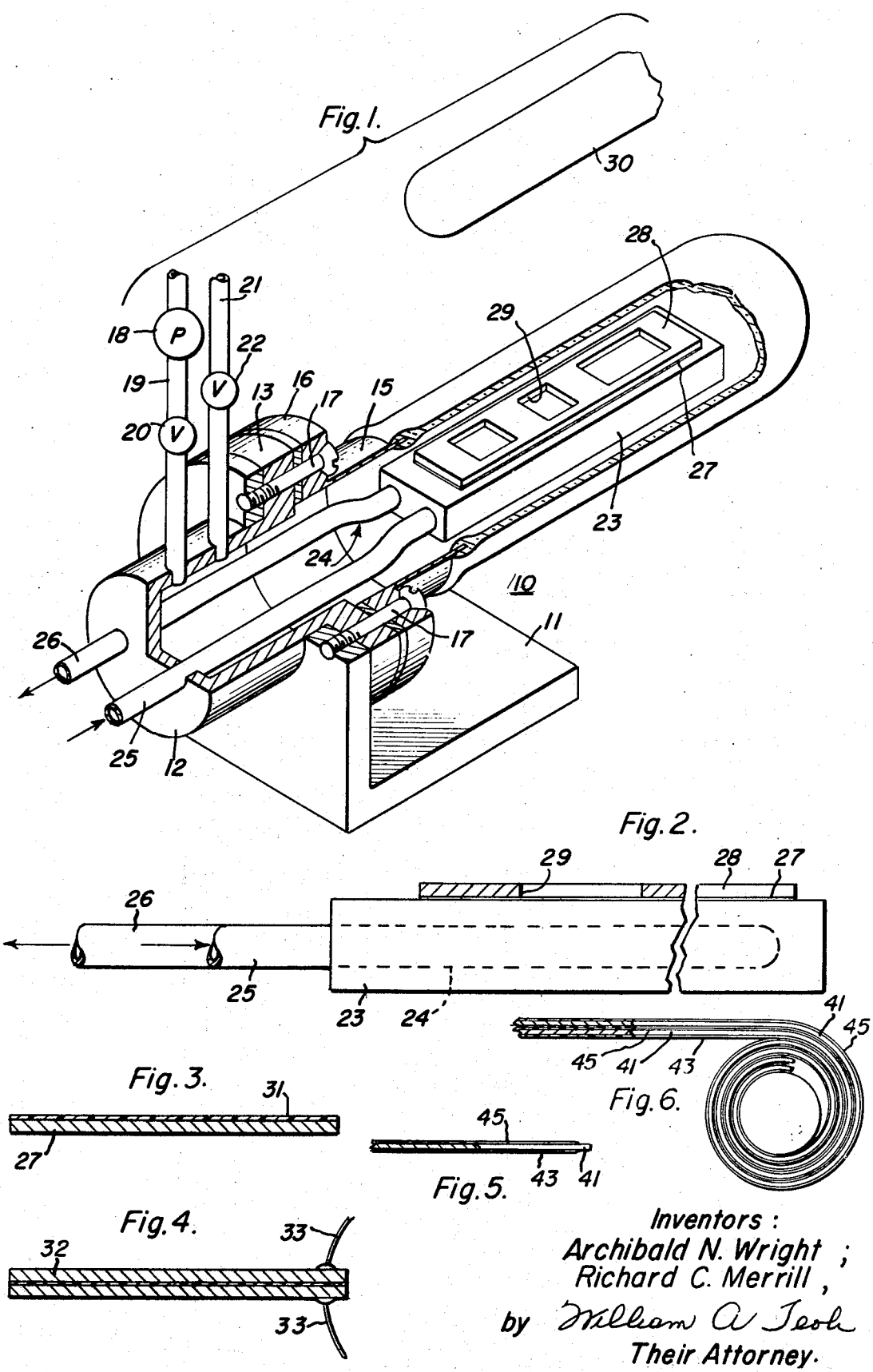

ABSTRACT OF THE DISCLOSURE

A method for making a capacitor is provided by photopolymerizing a gaseous perhalogenated organic material in contact with the surface of a first electrode to produce a continuous, imperforate adherent dielectric film thereon, and thereafter employing a second electrode in association with the resulting dielectric film-first electrode composite.

---

This application is a continuation-in-part of application Ser. No. 530,813, filed Mar. 1, 1966, and assigned to the same assignee as the present invention. The present invention relates to a method for making capacitors and to capacitors produced by such methods. More particularly, the present invention relates to the production of a dielectric film on a metal substrate by the ultraviolet surface photopolymerization of a perhalogenated organic material.

The conventional type of capacitor has a pair of parallel electrically conducting plates or electrodes separated by an electrically insulating dielectric film and an electrical lead connected to each of the electrodes. Such dielectric films should have a low dissipation factor, thinness, high dielectric constant, and a high breakdown strength. Additionally, when a dielectric film is employed, it must be continuous and be imperforate to function as an effective dielectric. It is further required that the film material be stable at the temperature of operation of the particular capacitor. However, when a supported dielectric film is employed, the film must be adherent. Configurational deposition, for example, to provide for an integrated circuit is also sometimes desirable.

The present invention is directed to an improved capacitor which exhibits the above desirable characteristics. In addition, the capacitors made in accordance with the present invention have dielectric films which are flexible and possess improved thermal stability.

A further advantage of the capacitors made in accordance with the practice of the present invention is that the dielectric films experience only a small change in dielectric properties such as dielectric constant and dissipation factor at temperatures to 200° C.

The present invention is based on the discovery that superior dielectric films can be made by the ultraviolet surface photopolymerization of a gaseous perhalogenated organic material. The perhalogenated organic material that can be employed in the practice of the present invention consist essentially of chemically combined carbon atoms and halogen atoms, such as chlorine atoms, fluorine atoms, bromine atoms, iodine atoms, and mixtures thereof. Included by the perhalogenated organic material which can be employed in the practice of the invention are, for example, hexachlorobutadiene, tetrafluoroethylene, trichloromonochloroethylene, monofluorotrichloroethylene, hexafluorobutadiene, etc.

In accordance with the invention, there is provided a method for making a capacitor which comprises (1) effecting the ultraviolet surface polymerization of a vaporous photopolymerizable perhalogenated organic material in contact with the surface of a first electrode to produce a continuous adherent flexible dielectric film thereon having a thickness of at least about 125 angstroms, and (2) thereafter employing a second electrode in association with the dielectric film-first electrode composite.

The invention will be better understood from the following description taken in connection with the accompanying drawings in which:

FIG. 1 is a perspective view partially in section of an apparatus for forming dielectric films on electrodes in accordance with our invention;

FIG. 2 is an enlarged side elevational view partially in section of a portion of the apparatus shown in FIG. 1;

FIG. 3 is a sectional view of an electrode with a dielectric film thereon formed in accordance with our invention;

FIG. 4 is a sectional view of an improved capacitor embodying our invention;

FIG. 5 is a sectional view of an electrode having an adherent dielectric film on both sides formed in accordance with the invention; and FIG. 6 is a sectional view of a capacitor roll made by rolling flexible electrodes with dielectric film on both sides around a mandrel.

In FIG. 1 of the drawing, apparatus is shown generally at 10 for forming dielectric films on the surfaces of electrodes for producing capacitors in accordance with our invention. A base or support surface (not shown) is provided on which is mounted an L-shaped bracket 11 to support enclosure or chamber 12 having a flange 13 at its open end. A quartz tube 14 is bonded adjacent at its open end by any suitable metal-ceramic seal to a metal cylinder 15 having a flange 16 at its opposite end. Flange 16 is readily threaded to and unthreaded from flange 13 of enclosure 12 by means of a plurality of threaded fasteners 17. A vacuum pump 18 is connected by a line 19 to enclosure 12 to evacuate the latter and associated quartz tube 14. A control valve 20 is provided in evacuation line 19. An inlet line 21 is connected at one end to enclosure 12 and at its other end to a source (not shown) of material to be supplied in gaseous state to tube 14. A control valve 22 is provided in line 21 to control the supply of material to enclosure 12 and tube 14.

A support block 23 of material such as copper, as shown, is positioned within tube 14. Block 23 has a U-shaped metal tube 24 imbedded therein, two ends 25 and 26 of which extend through cylinder 15, flanges 16 and 13, enclosure 12 and through the wall of the latter. Tube 24 circulates a cooling medium such as ethanol to block 23 and positions the block. The ends 25 and 26 of tube 24 are connected to a heat exchanger or to other cooling equipment. A substrate in the form of an aluminum foil electrode 27 is shown positioned on support block 23. A stainless steel light mask 28, which is shown as the same size as aluminum foil 27, has three slots 29 therethrough to provide formation of predetermined patterned thin dielectric films on aluminum foil 27. An ultraviolet light 30, which is normally provided with a reflector (not shown), is shown outside and spaced about quartz tube 14 and supported in any suitable manner. Ultraviolet light can be employed in a region of about 1,800 angstroms to 3,500 angstroms, which is directed by the reflector (not shown) towards the upper surface of aluminum foil electrode 27. For example, a Hanovia 700 watt lamp with a reflector can be employed in the practice of the invention. A metal enclosure with a door, which is not shown, is positioned around the above apparatus during its operation.

In FIG. 2 of the drawing, an enlarged side elevation view is shown of support block 23 which was described above in connection with FIG. 1 of the drawing. Block 23 has a U-shaped tube 24 imbedded therein, the two ends 25 and 26 of which circulate a cooling medium to and from block 23, respectively. Electrode 27 and light mask 28 are shown partially in section to disclose more clearly the apparatus. While three slots 29 are described for light mask 28, a single slot or a larger number of slots may be employed.

In FIG. 3 of the drawing, there is shown in section an electrode 27 with a continuous dielectric film adhering firmly to the upper surface. Film 31 is formed on the surface of electrode 27 in the apparatus shown in FIG. 1 of the drawing.

In FIG. 4 of the drawing, there is shown in section a capacitor which has the first electrode and continuous dielectric film adhering firmly to its upper surface (as illustrated in FIG. 3), a second electrode 32 in contact with dielectric film 31, and an electrical lead 33 connected to each of the electrodes. Film 31 is formed on the upper surface of electrode 27 in the apparatus shown in FIG. 1 of the drawing. Such a capacitor can also be made by employing a composite sheet having a first electrode 27, a dielectric film 31 thereon, and a second electrode 32 in contact with film 31. The composite sheet is cut, subsequently, into a plurality of smaller sheets. Each of the smaller sheets has a pair of leads 33 attached to its electrodes thereby forming a plurality of capacitors.

In FIG. 5 of the drawing, there is shown in section, a flexible electrode 41 with a continuous dielectric film adhering firmly to the upper and lower surfaces. Film 43 is formed on the surface of electrode 41 on the apparatus shown in FIG. 1 of the drawing. Film 45 also is formed on the opposite surface of electrode 41 following the same procedure. The dielectric films 43 and 45 also can be formed simultaneously on both sides of electrode 41 in accordance with the practice of the invention.

In FIG. 6, two electrodes, as shown by 41, are wound around a mandrel to produce a capacitor roll of desired size. The thickness of the dielectric film can be up to 100,000 angstroms and preferably between 15,000 angstroms to 50,000 angstroms. If desired, a suitable capacitor roll also can be made by winding a composite as shown by FIG. 5 with a metal foil free of dielectric film.

In an illustrative operation of the apparatus shown in FIG. 1 of the drawing, an electrode 27 was positioned on copper support block 23. A stainless steel light mask 28 with three slots therein was placed on the upper surface of electrode 27. Quartz tube 14 was then attached by its flange 16 to flange 13 of enclosure 12 by means of threaded fastener 17. Vacuum pump 18 was started and pumped down the chamber defined by tube 14, cylinder 15, and enclosure 12 to a pressure of about 1 micron. Valve 20 was then closed.

A perhalogenated photopolymerizable organic material such as hexachlorobutadiene, tetrafluoroethylene, trifluoromonochloroethylene, monofluorotrichloroethylene, etc. when supplied from a liquid source (not shown) through line 21 in a gaseous state to enclosure 12 whereby it was fed into the interior of quartz tube 14. Each of the above materials is initially retained in its liquid state by maintaining its temperature below room temperature whch is accomplished by employing a cooling bath surrounding the liquid materials. The liquid is also maintained at a vapor pressure in the range of 0.1 to 8 millimeters of mercury by the temperature of the cooling bath whereby its introduction from the source to the inlet line is in a gaseous state. Ultraviolet lamp 30, having an effective wave length in the range of 1,800 to 3,500 angstroms, was positioned above quartz tube 14 and spaced approximately two inches from the upper surface of electrode 27.

The monomer was introduced into quartz tube 14 causing a rise in the pressure. A metal hood (not shown) was positioned around apparatus 10 since an ultraviolet light source is used. Lamp 30 is turned on. After a period of time, lamp 30 was shut off, monomer valve 22 was closed, and the system was pumped down to about 1 micron pressure to remove all by-products. The metal hood was removed and the vacuum was then broken. Tube 14 was cooled to room temperature and disconnected by unthreading fasteners 17 which held its associated flange 16 to flange 13. After tube 14 was removed, metal light mask 28 was removed. Examination of electrode 27 showed that three separate and distinct adherent continuous films 31 had been formed on the upper surface of the electrode.

Such an electrode 27 with its film 31 thereon as described above is shown in FIG. 3 of the drawing.

In FIG. 4 of the drawing, there is shown a capacitor made in accordance with my invention. The capacitor has a first electrode 27, a continuous dielectric film 31 adhering firmly to the upper surface of electrode 27, a second electrode 32 in contact with dielectric film 27, and an electrical lead 33 connected to each electrode. The second electrode 32 is evaporated onto dielectric film 27 from a metal source.

The capacitor roll of FIG. 6 made in accordance with the invention also can be encapsulated, or can be placed in a suitable container to produce a capacitor structure.

Examples of capacitors prepared in accordance with my invention are set forth in Tables Ia–d. In each of these examples, the apparatus of FIG. 1 was employed as described above to provide a first electrode with a continuous, imperforate dielectric film adhering firmly to one of its surfaces. The chamber was evacuated initially to a pressure of about one micron in each of the examples. Subsequently, a second electrode was placed in contact with the dielectric film surface and a pair of leads were connected to the respective electrodes.

TABLE Ia

| Example No. | Monomer | Vapor pressure mm. Hg | Process time, minutes | Average substrate temp., °C. |
|---|---|---|---|---|
| 1 | $C_4Cl_6$ | 0.13 | 120 | 102 |
| 2 | $C_4Cl_6$ | 0.13 | 135 | 102 |
| 3 | $C_4Cl_6$ | 0.13 | 35 | 102 |
| 4 | $C_4Cl_6$ | 0.13 | 285 | 177 |
| 5 | $C_4Cl_6$ | 0.13 | 285 | 177 |
| 6 | $C_4Cl_6$ | 0.13 | 275 | 177 |
| 7 | $C_4Cl_6$ | 0.13 | 60 | 115 |
| 8 | $C_4Cl_6$ | 0.13 | 30 | 115 |
| 9 | $C_4Cl_6$ | 0.13 | 15 | 102 |
| 10 | $C_4Cl_6$ | 0.13 | 40 | 102 |
| 11 | $C_4Cl_6$ | 0.13 | 60 | 102 |
| 12 | $C_2F_4$ | 4.0 | 56 | 12 |
| 13 | $C_4F_4$ | 4.0 | 26 | 12 |
| 14 | $C_2F_4$ | 4.0 | 25 | −5 |
| 15 | $C_2ClF_3$ | 3.0 | 45 | 117 |

TABLE Ib

| Example No. | Number electrodes coated | First electrode material | Second electrode material | Dielectric area, cm.² |
|---|---|---|---|---|
| 1 | 12 | Evaporated aluminum. | Evaporated aluminum. | 0.25 |
| 2 | 12 | do | do | 0.25 |
| 3 | 12 | do | do | 0.25 |
| 4 | 1 | do | Hg drop | 0.1 |
| 5 | 1 | do | do | 0.1 |
| 6 | 1 | do | do | 0.1 |
| 7 | 1 | do | do | 0.1 |
| 8 | 1 | do | do | 0.1 |
| 9 | 1 | do | do | 0.1 |
| 10 | 1 | do | Evaporated aluminum. | 13 |
| 11 | 1 | do | do | 13 |
| 12 | 6 | Aluminum foil. | Evaporated gold. | 0.38 |
| 13 | 6 | do | do | 0.45 |
| 14 | 6 | Evaporated aluminum. | Evaporated aluminum. | 0.23 |
| 15 | 1 | do | Hg drop | 0.1 |

TABLE Ic

| Example No. | Dielectric constant | Representative capacitance, picofarads | Average film thickness, angstroms |
|---|---|---|---|
| 1 | 2.9 | 2,580–4,180 | ~1,500 |
| 2 | 2.9 | 3,060–4,000 | ~1,900 |
| 3 | 2.9 | 6,550–7,500 | ~900 |
| 4 | 2.9 | 5,700 | 480 |
| 5 | 2.9 | 5,370 | 508 |
| 6 | 2.9 | 4,240 | 645 |
| 7 | 2.9 | 1,390 | 1,900 |
| 8 | 2.9 | 2,480 | 1,100 |
| 9 | 2.9 | 1,340 | 2,040 |
| 10 | 2.9 | 254,000 | 1,180 |
| 11 | 2.9 | 178,000 | 1,650 |
| 12 | ~2 | 9,340 | ~680 |
| 13 | ~2 | 30,900 | ~240 |
| 14 | ~2 | 2,790 | ~1,480 |
| 15 | ~3 | 250 | ~10,650 |

TABLE Id

| Example No. | Characteristic capacitance/area, pf./cm.$^2$ | Dissipation factor | Breakdown strength v./cm.×10$^{-6}$ |
|---|---|---|---|
| 1 | 13,500 | 0.002–0.007 | 1.0 |
| 2 | 14,000 | 0.002–0.007 | |
| 3 | 28,000 | 0.005–0.007 | |
| 4 | 57,000 | | 1.1 |
| 5 | 53,700 | | 1.3 |
| 6 | 42,400 | | 1.2 |
| 7 | 13,900 | | |
| 8 | 24,800 | | |
| 9 | 13,400 | | 1.2 |
| 10 | 18,850 | 0.004 | 0.2 |
| 11 | 13,700 | 0.004 | 0.2 |
| 12 | 24,500 | 0.024 | |
| 13 | 68,700 | 0.024 | 2.0 |
| 14 | 12,100 | 0.039 | |
| 15 | 2,500 | 0.005 | |

EXAMPLE 16

In accordance with the above procedure, capacitors are made with evaporated aluminum electrodes and dielectric films having a thickness of about 13,000 angstroms. The dielectric films are made by photopolymerizing butadiene, hexachlorobutadiene, and tetrafluoroethylene. The dielectric properties of the film of the respective capacitors are measured over a temperature range of 20° C. to 200° C. The capacitance and dissipation factor of the capacitors are measured with a type 1650–A General Radio Company impedance bridge. The change in capacitance and dissipation factor is recorded at a particular temperature when the dielecetric film achieves an equilibrium value when measured for a 12-hour period. It is found that dielectric films made from hexachlorobutadiene and tetrafluoroethylene change slightly in capacitance in a uniform manner over a temperature range of from 20° C. to 200° C. An abrupt change is noted for butadiene at about 140° C. where the capacitance then beigns to alter rapidly.

Table II further shows the above results where percent ΔK is the percent change in capacitance, per ° C. over a temperature range of from 20° C. to 200° C. Percent ΔK is the slope of the line of several equilibrium temperatures between 20° C. to 200° C. Percent ΔK for butadiene is about the same for hexachlorobutadiene and tetrafluoroethylene up to 140° C., where an abrupt change is noted for butadiene:

TABLE II

| | Percent ΔK/° C. | |
|---|---|---|
| | 20°–140° | 140°–200° C. |
| $C_4Cl_6$ | −0.016 | −0.016 |
| $C_2F_4$ | ~0.02 | ~0.02 |
| $C_4H_6$ | 0.01 | >0.035 |

Similar capacitors having dielectric films of hexachlorobutadiene, tetrafluoroethylene, and butadiene, as above, are tested for percent dissipation factor, percent DF, at temperatures in the range of 20° C. to 200° C. for various periods of time utilizing a signal of 1,000 cycles per second. Table III below shows the results obtained at 133° C. for 140 hours and 162° C. for 115 hours:

TABLE III

| | Percent DF | |
|---|---|---|
| | 133° C. (140 hrs.) | 162° C. (115 hrs.) |
| $C_4Cl_6$ | 0.22 | 0.24 |
| $C_2F_4$ | 0.22 | 0.24 |
| $C_4H_6$ | >2.4 | >4 |

It is further found that the dissipation factor and the dielectric constant of the perhalogenated films reverse to about their original values of about 0.1% when cooled to room temperature. The butadiene film, however, is found to have a dissipation factor above 2%, although its dissipation factor at room temperature is originally about 0.45%.

Table II and Table III above show that capacitors made in accordance with the present invention are substantially stable over a wide temperature range such as from 20° C. to 200° C. as compared to a capacitor utilizing a dielectric film made from a photopolymerizable material which is not a perhalogenated organic material as utilized in the invention.

EXAMPLE 17

A capacitor roll is made in accordance with the invention utilizing ¼ mil x 2″ aluminum foil. A hexachlorobutadiene film having a thickness of about 20,000 angstroms is formed simultaneously on both sides of the aluminum foil by ultraviolet surface photopolymerization of hexachlorobutadiene utilizing ultraviolet light having a wavelength of 1,850 angstroms. Two of the aforementioned aluminum hexachlorobutadiene film composites simultaneously are wrapped 100 times around a ¹⁄₁₆″ diameter mandrel, using a capacitor winding machine. Leads are connected to the inner and outer electrodes of the resulting capacitor roll. The resulting capacitor is electrically connected in series to an ohm meter and a source of EMF to determine the resistance of the capacitor. Upon closing the circuit, an instantaneous deflection of the ohm meter is noted, which then indicates infinite resistance. This establishes that there is no short circuit in the capacitor. Similar results are obtained when other perhalogenated hydrocarbons are employed such as tetrafluoroethylene in place of the hexachlorobutadiene.

The same procedure is repeated except that in place of the hexachlorobutadiene, butadiene is simultaneously photopolymerized on both sides of a ¼ mil aluminum foil to a thickness of about 20,000 angstroms. A capacitor roll is made in the same manner as described above. The continuity test is again repeated with the same ohm meter and source of EMF to determine whether there is a short circuit in the capacitor roll. A short circuit is found when the circuit is completed.

Based on the above results, those skilled in the art would know that the above tests establish that films made from hexachlorobutadiene are flexible at 20,000 angstroms while films made from butadiene do not possess a satisfactory degree of flexibility to make a capacitor roll in the manner described.

Although the above examples are limited to a few of the very many variables within the scope of the present invention, it should be understood that the method of the present invention is directed to a much broader class of capacitors which can include any perhalogenated organic photopolymerizable material and any metal substrate which is suitable for suitable capacitor applications.

We claim:

1. A method which comprises (1) effecting the ultraviolet surface polymerization of the vapor of a photopolymerizable perhalogenated organic material in contact with the surface of a first electrode to produce a continuous adherent and flexible dielectric film thereon having a thickness of at least about 125 angstroms, and (2)

thereafter employing a second electrode in association with the resulting dielectric film-first electrode composite of (1) to produce a capacitor.

2. A method in accordance with claim 1, where the dielectric film has a thickness between 125 angstroms to about 13,000 angstroms.

3. A method in accordance with claim 1, where the dielectric film has a thickness between 15,000 and 50,000 angstroms.

4. A method in accordance with claim 1, where the perhalogenated material is a member selected from the class consisting of hexachlorobutadiene, tetrafluoroethylene, trifluoromonochloroethylene, monofluorotrichloroethylene, and hexafluorobutadiene.

5. A method in accordance with claim 1, where the electrodes are metal foils and the dielectric film is formed simultaneously on both sides of at least one of the electrodes.

6. A method in accordance with claim 1, where at least one of the electrodes is formed by the evaporation of metal.

7. A method of making a capacitor roll in accordance with claim 5.

8. A method in accordance with claim 1, where the photopolymerizable perhalogenated organic material is employed at a pressure of up to about 8 torr.

9. A method in accordance with claim 1, where the ultraviolet surface polymerization of the vaporous photopolymerizable perhalogenated organic material is effected by employing ultraviolet light in the region of from about 1,800 angstroms to 3,500 angstroms.

10. A method in accordance with claim 1, where the capacitor is made by the configurational deposition of the vaporous photopolymerizable perhalogenated organic material onto the first electrode.

11. A method in accordance with claim 1, where the first electrode is a metal selected from the class consisting of gold, tin, aluminum, copper and zinc.

12. A method in accordance with claim 1, which comprises (1) effecting the ultraviolet surface polymerization of materials selected from a class consisting of hexachlorobutadiene, tetrafluoroethylene, trifluoromonochloroethylene, monofluorotrichloroethylene, and hexafluorobutadiene on a metal substrate to produce a composite of metal and a continuous adherent flexible dielectric film having a thickness of at least 125 angstroms to 13,000 angstroms, and (2) thereafter applying a second electrode in contact with the dielectric film to produce a capacitor.

13. A method of making a capacitor roll which comprises (1) photopolymerizing a gaseous perhalogenated organic material in contact with the surface of a flexible metal foil to produce a first electrode composite consisting of the metal foil with a continuous adherent imperforate dielectric film on both sides having a thickness of at least 15,000 angstroms and (2) winding the first electrode composite together with a second flexible electrode around a mandrel.

References Cited

UNITED STATES PATENTS

| 2,211,583 | 8/1940 | Ruben. | |
| 2,932,591 | 4/1960 | Goodman | 117—93.31 X |
| 3,447,218 | 6/1969 | Wright | 317—258 X |

ELLIOT A. GOLDBERG, Primary Examiner

U.S. Cl. X.R.

117—93.31